US008855975B2

(12) United States Patent
Duan et al.

(10) Patent No.: US 8,855,975 B2
(45) Date of Patent: Oct. 7, 2014

(54) ADJUSTING WHEEL DIAMETER

(75) Inventors: Ning Duan, Beijing (CN); Zhong Bo Jiang, Beijing (CN); Wen Ting Mo, Beijing (CN); Wei Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 13/307,128

(22) Filed: Nov. 30, 2011

(65) Prior Publication Data
US 2012/0136637 A1 May 31, 2012

(30) Foreign Application Priority Data

Nov. 30, 2010 (CN) .......................... 2010 1 0577040

(51) Int. Cl.
*G06F 7/60* (2006.01)
*G01B 21/10* (2006.01)
*B61K 9/12* (2006.01)

(52) U.S. Cl.
CPC .. *G01B 21/10* (2013.01); *B61K 9/12* (2013.01)
USPC .................................. 703/2; 701/19; 701/29

(58) Field of Classification Search
USPC .......................................................... 703/2
See application file for complete search history.

(56) References Cited

U.S. PATENT DOCUMENTS

| 6,539,293 | B2 * | 3/2003 | Bachtiger et al. ............... 701/20 |
| 7,213,789 | B1 * | 5/2007 | Matzan ........................ 246/169 S |
| 7,574,289 | B2 * | 8/2009 | Moffett et al. .................. 701/19 |
| 2007/0043486 | A1 * | 2/2007 | Moffett et al. .................. 701/29 |
| 2007/0095988 | A1 * | 5/2007 | Kane et al. ................ 246/182 R |

OTHER PUBLICATIONS

Attivissimo et al. ("Railway Measurement System to Evaluate the Wheel-Rail Interaction Quality ", IEEE,2007, pp. 1583-1589).*
Jin et al. ("Experimental simulation and prediction of wear of wheel flange and rail gauge corner", Elsevier B.V., 2010,pp. 259-267).*
Wei et al. ("Real-Time Train Wheel Condition Monitoring by Fiber Bragg Grating Sensors", Hindawi Publishing Corporation., 2011, pp. 1-8).*

* cited by examiner

*Primary Examiner* — Omar Fernandez Rivas
*Assistant Examiner* — Iftekhar Khan
(74) *Attorney, Agent, or Firm* — Jeff Tang; Ann Vachon Dougherty

(57) ABSTRACT

A method and apparatus for adjusting wheel diameter by acquiring a current wheel diameter distribution vector; calculating similarity scores between the current wheel diameter distribution vector and known wheel diameter distribution vector clusters to determine a potential wear rate of the current wheel diameter distribution vector; calculating similarity scores between candidate target wheel diameter distribution vectors and the known wheel diameter distribution vector clusters to determine a potential wear rates of the candidate target wheel diameter distribution vectors; and selecting a target wheel diameter distribution vector from the candidate target wheel diameter distribution vectors, such that the reduction of potential wear rate achieved by switching the current wheel diameter distribution vector to the target wheel diameter distribution vector meets a predetermined condition. Future potential wear rates and the amount of grinding required during train maintenance can be optimized through changing wheel diameter distribution vectors.

14 Claims, 3 Drawing Sheets

ADJUSTING WHEEL DIAMETER

TECHNICAL FIELD

The present invention relates to the field of train data processing, and more particularly, to a method and apparatus for adjusting train wheel diameter.

DESCRIPTION OF THE RELATED ART

In high-speed train systems, the wheel is one of the critical factors for ensuring safety and comfort. The operators of high-speed railways need to maintain good operation conditions of the wheels. It is easy to understand that, for wheels to be in good operation conditions, the wheel diameter of each wheel should comply with a certain wheel diameter specification, and the wheel diameter differences between wheels should also comply with a certain wheel diameter difference specification. For instance, an exemplary wheel diameter difference specification has prescribed a maximum axle wheel diameter difference of 0.2 mm between a pair of wheels mounted on a same axle, and a maximum bogie wheel diameter difference of 3 mm among wheels mounted on a same bogie (i.e. car).

During the operation of high-speed trains, wheels may experience wear due to external factors such as collision with the rail; and, as a result, the wheel diameter may decrease below a minimum wheel diameter prescribed in a wheel diameter specification, causing the wheels to be scrapped. Due to the complexity of external factors, the wear amounts for different wheels are not completely the same. As a result, it is possible that although the wheel diameter has not yet deceased below the minimum wheel diameter prescribed by the wheel diameter specification, the wheel diameter difference no longer complies with the wheel diameter difference specification and thus the wheel may possibly be scrapped.

Therefore, during train maintenance, it is necessary to adjust the wheel diameter to comply with the wheel diameter difference specification. Existing methods generally grind a wheel having a larger diameter to reduce the wheel diameter difference between the wheel having a larger wheel diameter and the wheel having a smaller wheel diameter. FIG. 1(A) shows wheel diameters before adjustment and FIG. 1(B) shows the wheel diameters after adjustment. In FIGS. 1(A) and 1(B), vertical coordinates of square points represent left wheel diameters, and vertical coordinates of diamond points represent right wheel diameters; the points with the same horizontal coordinates correspond to the left and right wheels mounted on a same axle. It can be seen that after adjustment the wheel diameter difference between wheels on a same axle is almost zero, causing those diamond points to be almost overlapped by square points. It can also be seen that through adjustment, the wheel having a larger wheel diameter in a pair of wheels on a same axle is ground to have the same wheel diameter as the wheel having a smaller wheel diameter in said pair of wheels. It may also be necessary to grind other wheels with reference to the smallest wheel diameter of the wheels on a same bogie in the case where a maximum bogie wheel diameter difference has been prescribed.

Although the limitation on maximum wheel diameter difference can be satisfied after grinding, the wheel diameter distribution of the whole train may change due to lack of a global consideration. FIG. 1(C) shows a comparison of the left wheels before and after adjustment, wherein diamond points represent wheel diameters before adjustment, and square points represent wheel diameters after adjustment. It can be seen that the distribution between successive wheels represented by the points within the circles has varied after adjustment. Such a change may adversely affect the future operating condition of the wheels.

SUMMARY OF THE INVENTION

The embodiments of the present invention provide a method and apparatus for wheel diameter adjustment.

The method according to embodiments of the present invention comprises: acquiring a current wheel diameter distribution vector; calculating similarity scores between the current wheel diameter distribution vector and known wheel diameter distribution vector clusters to determine a potential wear rate of the current wheel diameter distribution vector; calculating similarity scores between candidate target wheel diameter distribution vectors and the known wheel diameter distribution vector clusters to determine potential wear rates of the candidate target wheel diameter distribution vectors; and selecting a target wheel diameter distribution vector from the candidate target wheel diameter distribution vectors, such that the reduction of potential wear rate achieved by switching the current wheel diameter distribution vector to the target wheel diameter distribution vector meets a predetermined condition.

The apparatus according to embodiments of the present invention comprises: acquisition means, configured to acquire a current wheel diameter distribution vector; first potential wear rate determining means, configured to calculate similarity scores between the current wheel diameter distribution vector and known wheel diameter distribution vector clusters to determine a potential wear rate of the current wheel diameter distribution vector; second potential wear rate determining means, configured to calculate similarity scores between candidate target wheel diameter distribution vectors and the known wheel diameter distribution vector clusters to determine potential wear rates of the candidate target wheel diameter distribution vectors; and selection means, configured to select a target wheel diameter distribution vector from the candidate target wheel diameter distribution vectors, such that the reduction of potential wear rate achieved by switching the current wheel diameter distribution vector to the target wheel diameter distribution vector meets a predetermined condition.

According to the technical solutions provided by the embodiments of the present invention, the influence of wheel diameter distribution vectors on future potential wear rates can be taken into account during wheel diameter adjustment and thus the wheel diameter distribution vectors can be optimized.

DETAILED DESCRIPTION OF THE PREFERRED EMBODIMENT

Figure 1A:
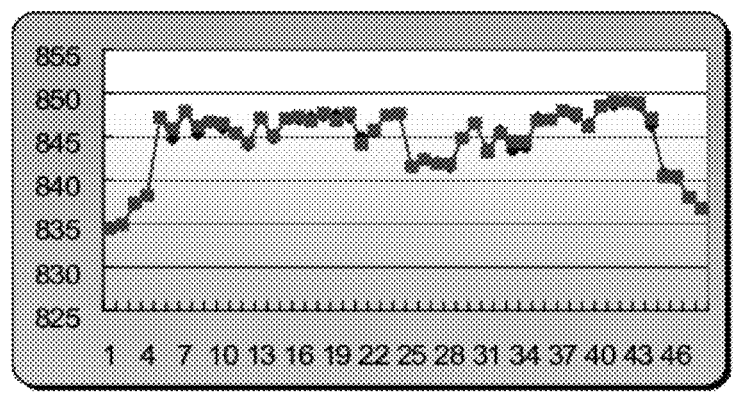
FIGS. 1(A)-1(C) are diagrams of train wheel diameter distributions.
Figure 1B:
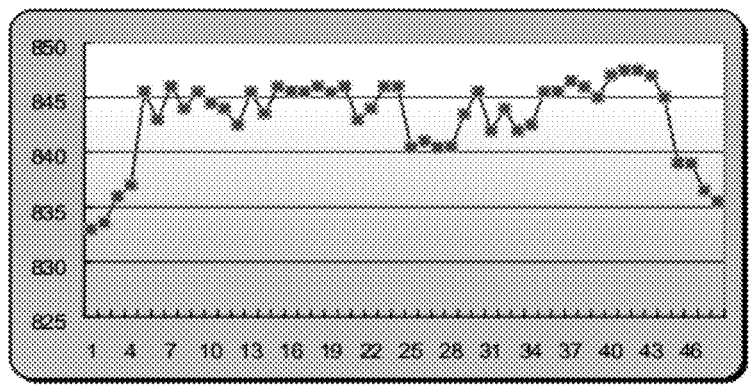
Figure 1C:
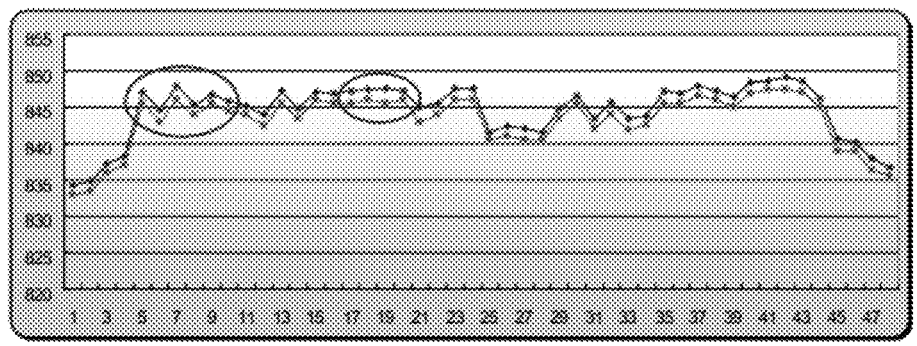
Figure 2:
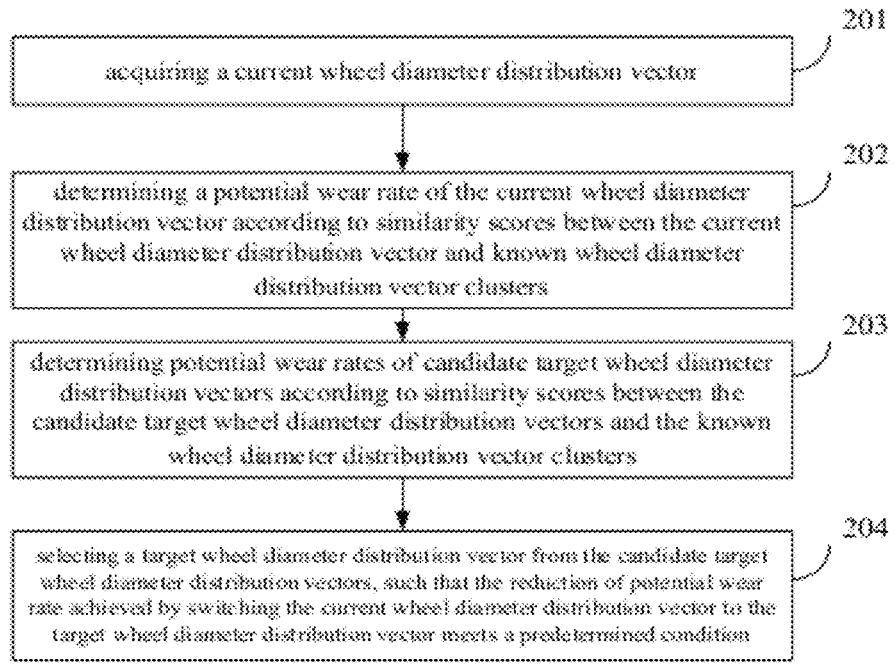
FIG. 2 is a flow chart of a method for adjusting wheel diameter according to an embodiment of the present invention.

FIG. 2 shows a flow chart of the computer-implemented method for adjusting wheel diameter according to an embodiment of the present invention.

At step 201, a current wheel diameter distribution vector of a train to be maintained is acquired.

The current wheel diameter distribution vector can be obtained by measuring the wheel diameters of the wheels of the train to be maintained. A wheel diameter distribution vector represents the distribution of wheel diameters along the longitudinal direction of the train. For example, suppose that a train has 48 pairs of wheels, then a wheel diameter distribution vector can be represented as:

$$D=[d_1, d_2, \ldots d_{47}, d_{48}],$$

wherein, $d_i$ represents the wheel diameter of the $i^{th}$ wheel.

It can be understood by those skilled in the art that the current wheel diameter distribution vector of the left wheels of the train to be maintained may differ from the current wheel diameter distribution vector of the right wheels. For the convenience of processing, either of the current wheel diameter distribution vector of the left wheels and the current wheel diameter distribution vector of the right wheels can be selected as the current wheel diameter distribution vector of the train to be maintained. It is also possible to combine the current wheel diameter distribution vector of the left wheels and the current wheel diameter distribution vector of the right wheels as the current wheel diameter distribution vector of the train to be maintained. For example, as mentioned previously, in order to ensure that a wheel diameter difference between the right wheel and the left wheel belonging to a same axle is smaller than a maximum axle wheel diameter difference, the wheel having a larger wheel diameter is usually ground. Assuming that $D_L$ is the current wheel diameter distribution vector of the left wheels, and $D_R$ is the current wheel diameter distribution vector of the right wheels, then the current wheel diameter distribution vector of the train to be maintained, $D_{L\&R}$, can be:

$$D_{L\&R}=[\min(d_{L1},d_{R1}),\min(d_{L2},d_{R2}) \ldots \min(d_{L47},d_{R47}), \min(d_{L48},d_{R48})],$$

wherein, "min" means taking the minimum value among those in the parentheses.

Various other methods can be conceived by those skilled in the art to obtain the current wheel diameter distribution vector of the train to be maintained from the current wheel diameter distribution vector of the left wheels and the current wheel diameter distribution vector of the right wheels.

Of course, it is also possible to treat the current wheel diameter distribution vector of the left wheels and the current wheel diameter distribution vector of the right wheels as two current wheel diameter distribution vectors.

At step 202, a potential wear rate of the current wheel diameter distribution vector is determined according to similarity scores between the current wheel diameter distribution vector and known wheel diameter distribution vector clusters.

The known wheel diameter distribution vector clusters are obtained from the wheel diameter distribution vectors recorded in various maintenance records prior to the present maintenance. It is possible to measure and record the wheel diameter distribution vector at the end of a previous maintenance, and record an actual wear rate at the next maintenance, so that the correspondence relationship between a known wheel diameter distribution vector and a actual wear rate can be obtained. The wear rate can be represented by wheel diameter reduction in millimeters or by costs corresponding thereto.

According to one embodiment of the present invention, each different known wheel diameter distribution vector can be treated as a known wheel diameter distribution vector cluster, i.e., each known wheel diameter distribution vector cluster contains only one known wheel diameter distribution vector, so that the actual wear rate corresponding to the known wheel diameter distribution vector is the average wear rate of the known wheel diameter distribution vector cluster.

Figure 3:
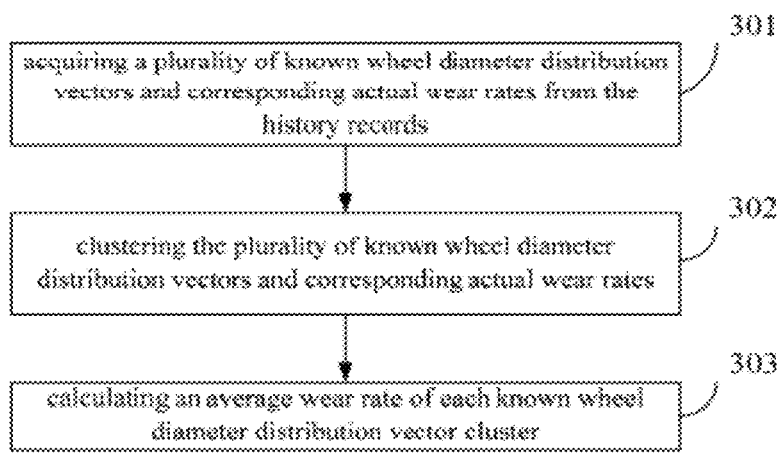
FIG. 3 is a flow chart for generating known wheel diameter distribution vector clusters according to an embodiment of the present invention.

Hereinafter, a method of generating known wheel diameter distribution vector clusters according to another embodiment of the present invention will be described with reference to FIG. 3.

At step 301, a plurality of known wheel diameter distribution vectors and corresponding actual wear rates are obtained from history records.

At step 302, the plurality of known wheel diameter distribution vectors and corresponding actual wear rates are clustered.

A variety of clustering methods can be readily conceived by those skilled in the art, such as partitioning clustering, hierarchical clustering, density-based clustering and model based clustering, etc., wherein the partitioning clustering may further comprise K-means clustering, K-median clustering and K-NN clustering.

A known wheel diameter distribution vector cluster thus generated may comprise a plurality of known wheel diameter distribution vectors.

At step 303, the average wear rate of each known wheel diameter distribution vector cluster is calculated.

For a known wheel diameter distribution vector cluster comprising only one known wheel diameter distribution vector, the actual wear rate corresponding to the known wheel diameter distribution vector is the average wear rate of the known wheel diameter distribution vector cluster. For a known wheel diameter distribution vector cluster comprising a plurality of known wheel diameter distribution vectors, the actual wear rates corresponding to the plurality of known wheel diameter distribution vectors may be weighted-averaged to obtain the average wear rate of the known wheel diameter distribution vector cluster. A variety of methods of assigning the weights used in the weighted-averaging can be conceived by those skilled in the art. For example, the ratio of the occurrence number of a certain known wheel diameter distribution vector to the total occurrence number of all the known wheel diameter distribution vectors contained in a corresponding known wheel diameter distribution vector cluster can be used as the weight of the actual wear rate corresponding to that known wheel diameter distribution vector. Of course, it is also possible to assign an identical weight to all the actual wear rates.

Step 301 to step 303 depict the steps of generating known wheel diameter distribution vector clusters for the first time according to the present embodiment. After the generation of known wheel diameter distribution vector clusters, each time a new known wheel diameter distribution vector and corresponding actual wear rate are recorded, it can be determined whether the new known wheel diameter distribution vector and the corresponding actual wear rate can be clustered into an already-generated known wheel diameter distribution vector cluster. If yes, it is clustered into the already-generated known wheel diameter distribution vector cluster, otherwise, they are treated as the first known wheel diameter distribution vector in a new known wheel diameter distribution vector cluster.

Figure 4:
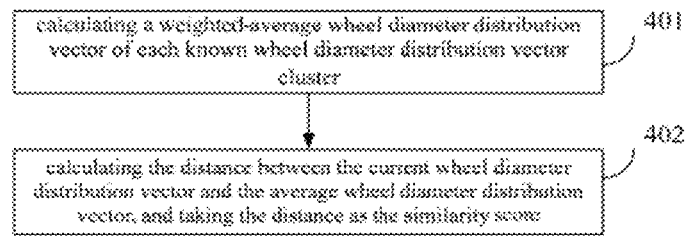
FIG. 4 illustrates a method for calculating similarity scores between a current wheel diameter distribution vector and known wheel diameter distribution vector clusters according to an embodiment of the present invention.

There are many methods for calculating the similarity scores between the current wheel diameter distribution vector and known wheel diameter distribution vector clusters. FIG. 4 shows a method for calculating the similarity scores between the current wheel diameter distribution vector and known wheel diameter distribution vector clusters according to one embodiment of the present invention.

At step 401, the weighted-average wheel diameter distribution vector of each known wheel diameter distribution vector cluster is calculated.

Vector averaging is a common technique in the art and the description thereof is omitted. A variety of methods can be conceived by those skilled in the art to assign the weights used in the weighted-averaging. For example, the ratio of the occurrence number of a certain known wheel diameter distribution vector to the total occurrence number of all the known wheel diameter distribution vectors contained in a corresponding known wheel diameter distribution vector cluster can be used as the weight of that known wheel diameter distribution vector. For a known wheel diameter distribution vector cluster having only one known wheel diameter distribution vector, that known wheel diameter distribution vector is the weighted-average wheel diameter distribution vector of the known wheel diameter distribution vector cluster.

At step 402, the distance between the current wheel diameter distribution vector and the averaged wheel diameter distribution vector is calculated and the distance is taken as a similarity score.

Various definitions of vector distance can be conceived by those skilled in the art and the description thereof is omitted.

Figure 5:
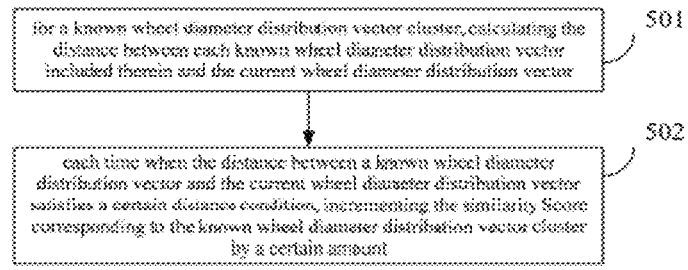
FIG. 5 illustrates a method for calculating similarity scores between the current wheel diameter distribution vector and known wheel diameter distribution vector clusters according to an embodiment of the present invention.

FIG. 5 illustrates a method for calculating the similarity scores between the current wheel diameter distribution vector and known wheel diameter distribution vector clusters according to another embodiment of the present invention.

At step 501, for a certain known wheel diameter distribution vector cluster, the distance between each known wheel diameter distribution vector contained therein and the current wheel diameter distribution vector is calculated.

At step 502, each time when the distance between a known wheel diameter distribution vector and the current wheel diameter distribution vector satisfies a certain distance condition, the similarity score corresponding to that known wheel diameter distribution vector cluster is incremented by a certain amount.

In the present embodiment, a larger value of the similarity score indicates a higher similar score. For example, the number of those known wheel diameter distribution vectors whose distances from the current wheel diameter distribution vector are smaller than a distance threshold can be used as the similarity score between the corresponding known wheel diameter distribution vector cluster and the current wheel diameter distribution vector. The number can be an absolute number or a relative number, or a combination thereof. Herein, "relative number" means the ratio of the absolute number of those known wheel diameter distribution vectors having a smaller distance from the current wheel diameter distribution vector than the distance threshold to the absolute number of the known wheel diameter distribution vectors contained in the corresponding known wheel diameter distribution vector cluster.

As can be appreciated by those skilled in the art, it is possible that the current wheel diameter distribution vector is not similar to any known wheel diameter distribution vector cluster. In that case, the current wheel diameter distribution vector can be treated as a new known wheel diameter distribution vector cluster.

Returning to FIG. 2, at step 203, potential wear rates of candidate target wheel diameter distribution vectors are determined according to similarity scores between the candidate target wheel diameter distribution vectors and the known wheel diameter distribution vector clusters.

The candidate target wheel diameter distribution vectors are those wheel diameter distribution vectors that can be obtained through adjusting the axle sequence of the train. In some trains, the smallest unit of adjusting axle sequence is bogie, that is, all the axles on one bogie need to be adjusted as a whole, which belongs to one manner of adjusting the axle sequence. It can be understood that the wheel diameter distribution vector may change after the axle sequence of the train has been adjusted. The similarity degree between a changed wheel diameter distribution vector and a known wheel diameter distribution vector cluster may differ from that of the wheel diameter distribution vector before the change. Thus, a candidate target wheel diameter distribution vector may have a different potential wear rate from that of the current wheel diameter distribution vector. The method of calculating the similarity degree between a candidate target wheel diameter distribution vector and a known wheel diameter distribution vector cluster is similar to the method of calculating the similarity degree between the current wheel diameter distribution vector and a known wheel diameter distribution vector cluster, and the description thereof is omitted.

At step 204, a target wheel diameter distribution vector is selected from the candidate target wheel diameter distribution vectors, such that the reduction of potential wear rate achieved through switching the current wheel diameter distribution vector to the target wheel diameter distribution vector satisfies a predetermined condition.

As mentioned previously, for each candidate target wheel diameter distribution vector, its potential wear rate can be obtained through a comparison with known wheel diameter distribution vector clusters. Therefore, the reduction of potential wear rate achieved through switching the current wheel diameter distribution vector to the candidate wheel diameter distribution vector is easily obtained, and further, a certain switch benefit represented in money corresponding to the reduction of potential wear rate can be obtained easily. On the other hand, those skilled in the art will appreciate that a certain switch cost represented in money is necessary for switching the current wheel diameter distribution vector to the candidate target wheel diameter distribution vector. The predetermined condition may be that the switch benefit corresponding to the reduction of potential wear rate is larger than the required switch cost as much as possible.

According to an embodiment of the present invention, the target wheel diameter distribution vector can be selected by an exhaustion method. First, all candidate target wheel diameter distribution vectors are enumerated that can be obtained through adjusting the axle sequence of the train. Those skilled in the art can understand that, for a limited number of axles, the total number of candidate target wheel diameter distribution vectors is limited. For each candidate target wheel diameter distribution vector, its corresponding switch benefit and switch cost can be obtained. Further, the candidate target wheel diameter distribution vector for which the switch benefit is larger than the switch cost to a greatest extent is selected as the target wheel diameter distribution vector.

According to another embodiment of the present invention, a target wheel diameter distribution vector can be determined from candidate target wheel diameter distribution vectors by solving an optimal problem. The present embodiment will be described below by using the bogie as a unit of switching. Those skilled in the art may appreciate that it is also possible to use the axle as a unit of switching. In an embodiment, the optimal problem can be described as follow:

constants
N: the number of bogies
decision variables:
$X_{i,j}$: =1, if bogie i is located at position j after switch;
=0, otherwise;
v: the potential wear rate corresponding to the selected target wheel diameter distribution vector;
$AD_L$: the target wheel diameter distribution vector of left wheels;
$AD_R$: the target wheel diameter distribution vector of right wheels;
wherein, i is the serial number of the bogie, j is the location number of the bogie, both ranging at [0, N−1].
constraints:

$$\text{for each } i, \sum_{j=0}^{N-1} x_{i,j} = 1;$$

$$\text{for each } j, \sum_{i=0}^{N-1} x_{i,j} = 1.$$

The two constraints above mean that the each bogie is necessarily and merely located at one position.
optimization targets:

$$\text{minimizing } v;$$

$$\text{and maximizing } \sum_{\substack{i \in [0,N-1], \\ i=j}} \sum_{j=0}^{N-1} x_{i,j}$$

wherein the first optimization target is to minimize the potential wear rate corresponding to the selected target wheel diameter distribution vector; and the second optimization target is to maximize the number of bogies to be held unchanged.

Given the optimal problem, those skilled in the art can solve the optimal problem by various algorithms. Common methods for solving the optimal problem comprise simulated annealing algorithm, genetic algorithm, and integer programming algorithm.

As mentioned above, during train maintenance, it is necessary to adjust wheel diameter to conform to a wheel diameter difference specification through grinding. By using the method for solving the optimal problem, it is possible to optimize the amount of grinding, the switch cost and the switch benefit in a comprehensive manner. Again, assuming the bogie as a unit of switching, the optimal problem can be described as follow:

constants
N: the number of bogies;
M: the number of axles on each bogie;
$BD_L$: the current wheel diameter distribution vector of left wheels;
$BD_R$: the current wheel diameter distribution vector of right wheels;
T1: the maximum bogie wheel diameter difference;
T2: the maximum axle wheel diameter difference.
decision variables:
$X_{i,j}$: =1, if bogie i is located at position j after switch;
=0, otherwise;
v: the potential wear rate corresponding to the selected target wheel diameter distribution vector;
$AD_L$: the target wheel diameter distribution vector of left wheels;
$AD_R$: the target wheel diameter distribution vector of right wheels;
$\delta_k$: the amount of grind of the wheel having a larger diameter on the kth axle;
wherein, i is the serial number of the bogie; j is the location number of the bogie, both ranging at [0, N−1]; k is the serial number of the axle, ranging at [0, M*N−1].
constraints:

$$\text{for each } i, \sum_{j=0}^{N-1} x_{i,j} = 1;$$

$$\text{for each } j, \sum_{i=0}^{N-1} x_{i,j} = 1;$$

$$|bd_{LK} - bd_{RK}| - \delta_K \le T2,$$

after grind, the maximum bogie wheel diameter difference among those wheels on the same bogie≤T1.

The former two constraints mean that each bogie is necessarily and merely located at one position. The third constraint means that the wheel diameter difference between left wheel and right wheel on the same axle must be smaller than the maximum axle wheel diameter difference after grind.
optimization targets:

$$\text{minimizing } v;$$

$$\text{maximizing } \sum_{\substack{i \in [0,N-1], \\ i=j}} \sum_{j=0}^{N-1} x_{i,j};$$

$$\text{and minimizing } \sum_{K=0}^{M*N-1} \delta_k,$$

wherein the first optimization target is to minimize the potential wear rate corresponding to the selected target wheel diameter distribution vector; the second optimization target is to maximize the number of bogies to be held unchanged; the third optimization target is to minimize the amount of grind.

By solving the above optimal problem, it is possible to output a target wheel diameter distribution vector, which is optimal in terms of reducing the potential wear rate, the switch costs and the amount of grinding as much as possible.

Figure 6:
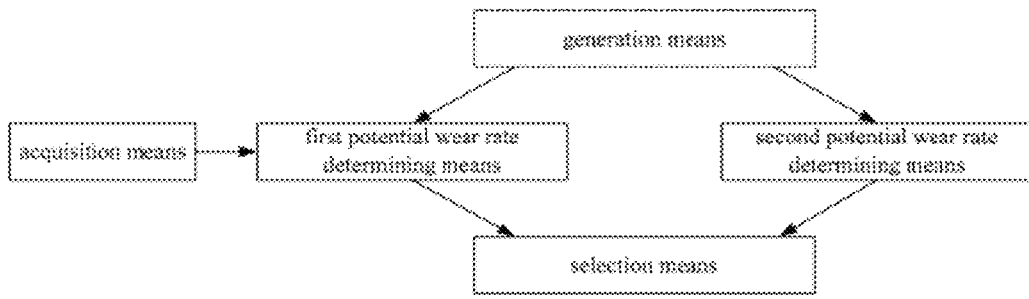
FIG. 6 is a block diagram of an apparatus for adjusting wheel diameter according to an embodiment of the present invention.

FIG. 6 is a block diagram of a computer apparatus for adjusting wheel diameter according to an embodiment of the present invention. The apparatus comprises at least one processing device and components comprising:
acquisition means configured to acquire a current wheel diameter distribution vector;

first potential wear rate determining means configured to calculate the similarity scores between the current wheel diameter distribution vector and known wheel diameter distribution vector clusters to determine a potential wear rate of the current wheel diameter distribution vector;

second potential wear rate determining means configured to calculate similarity scores between candidate target wheel diameter distribution vectors and the known wheel diameter distribution vector clusters to determine potential wear rates of the candidate target wheel diameter distribution vectors; and selection means configured to select a target wheel diameter distribution vector from the candidate target wheel diameter distribution vectors such that the reduction of potential wear rate by switching the current wheel diameter distribution vector to the target wheel diameter distribution vector meets a predetermined condition.

As shown in FIG. 6, the apparatus may further comprise:

generation means configured to generate the known wheel diameter distribution vector clusters from the known wheel diameter distribution vectors in history records.

Those skilled in the art will recognize that the above-described methods and systems may be implemented in computer executable instructions and/or embodied as processor control code, which, for example, can be provided on a carrier medium such as a disk, CD or DVD-ROM, or programmable memory such as read only memory (firmware). The apparatus and its components of the present embodiment can be implemented in hardware circuits, for example, in semiconductors such as very large scale integration circuits or gate arrays, a logic chip, a transistor and the like, or in programmable hardware devices such as FPGA (Field Programmable Gate Array), programmable logic devices and the like, or can be implemented in a combination of the above mentioned hardware circuits and software, such as in firmware.

Although a number of exemplary embodiments have been illustrated and described, it will be understood by those skilled in the art that various modifications to those embodiments can be made without departing from the principle and spirit of the present invention. The scope of the present invention is defined by the following claims and their equivalents.

What is claimed is:

1. A method for adjusting wheel diameter, comprising:
   acquiring a current wheel diameter distribution vector, wherein a current wheel diameter distribution vector represents a distribution of wheel diameters along at least one longitudinal direction of a vehicle;
   calculating similarity scores between the current wheel diameter distribution vector and known wheel diameter distribution vector clusters to determine a potential wear rate of the current wheel diameter distribution vector;
   calculating similarity scores between candidate target wheel diameter distribution vectors and the known wheel diameter distribution vector clusters to determine potential wear rates of the candidate target wheel diameter distribution vectors; and
   selecting a target wheel diameter distribution vector from the candidate target wheel diameter distribution vectors, such that the reduction of the potential wear rate achieved by switching the current wheel diameter distribution vector to the target wheel diameter distribution vector meets a predetermined condition, wherein selecting the target wheel diameter distribution vector from the candidate target wheel diameter distribution vectors comprises taking a reduction of potential wear rate achieved by switching the current wheel diameter distribution vector to a candidate target wheel diameter distribution vector as a switch benefit of the candidate target wheel diameter distribution vector, and taking a cost required for switching the current wheel diameter distribution vector to the candidate target wheel diameter distribution vector as a switch cost of the candidate target wheel diameter distribution vector, selecting the candidate target wheel diameter distribution vector for which the switch benefit is larger than the switch cost to a greatest extent as the target wheel diameter distribution vector.

2. The method according to claim 1, further comprising:
   generating the known wheel diameter distribution vector clusters from known wheel diameter distribution vectors in history records.

3. The method according to claim 2, wherein generating the known wheel diameter distribution vector clusters from the known wheel diameter distribution vectors in the history records comprises:
   acquiring a plurality of known wheel diameter distribution vectors and corresponding actual wear rates from the history records;
   clustering the plurality of known wheel diameter distribution vectors and corresponding actual wear rates to generate the known wheel diameter distribution vector clusters; and
   calculating an average wear rate of each known wheel diameter distribution vector cluster.

4. The method according to claim 1, wherein calculating the similarity scores between the current wheel diameter distribution vector and the known wheel diameter distribution vector clusters comprises:
   calculating a weighted-average wheel diameter distribution vector of each known wheel diameter distribution vector cluster;
   calculating a distance between the current wheel diameter distribution vector and the average wheel diameter distribution vector, and taking the distance as the similarity score.

5. The method according to claim 1, wherein calculating the similarity scores between the current wheel diameter distribution vector and the known wheel diameter distribution vector clusters comprises:
   for a certain known wheel diameter distribution vector cluster, calculating a distance between each known wheel diameter distribution vector included therein and the current wheel diameter distribution vector;
   determining the similarity score between the known wheel diameter distribution vector cluster and the current wheel diameter distribution vector according to the number of known wheel diameter distribution vectors within the known wheel diameter distribution vector cluster whose distance to the current wheel diameter distribution vector meets a distance condition.

6. The method according to claim 1, wherein calculating the similarity scores between candidate target wheel diameter distribution vectors and the known wheel diameter distribution vector clusters comprises:
   enumerating all candidate target wheel diameter distribution vectors that can be obtained through adjusting an axle sequence of the vehicle;
   for each enumerated candidate target wheel diameter distribution vector, calculating the similarity score between it and the known wheel diameter distribution vector clusters.

7. The method according to claim 1, wherein acquiring the current wheel diameter distribution vector comprises:

acquiring a current wheel diameter distribution vector of left wheels and a current wheel diameter distribution vector of right wheels; and combining the current wheel diameter distribution vector of the left wheels and the current wheel diameter distribution vector of the right wheels as the current wheel diameter distribution vector.

8. A computer apparatus for adjusting wheel diameter, comprising:

at least one processing device for implementing components;

acquisition component, configured to acquire a current wheel diameter distribution vector, wherein a current wheel diameter distribution vector represents a distribution of wheel diameters along at least one longitudinal direction of a vehicle;

first potential wear rate determining component, configured to calculate similarity scores between the current wheel diameter distribution vector and known wheel diameter distribution vector clusters to determine a potential wear rate of the current wheel diameter distribution vector;

second potential wear rate determining component, configured to calculate similarity scores between candidate target wheel diameter distribution vectors and the known wheel diameter distribution vector clusters to determine potential wear rates of the candidate target wheel diameter distribution vectors; and selection component, configured to select a target wheel diameter distribution vector from the candidate target wheel diameter distribution vectors, such that the reduction of potential wear rate achieved by switching the current wheel diameter distribution vector to the target wheel diameter distribution vector meets a predetermined condition, wherein selecting the target wheel diameter distribution vector from the candidate target wheel diameter distribution vectors comprises taking a reduction of potential wear rate achieved by switching the current wheel diameter distribution vector to a candidate target wheel diameter distribution vector as a switch benefit of the candidate target wheel diameter distribution vector, and taking a cost required for switching the current wheel diameter distribution vector to the candidate target wheel diameter distribution vector as a switch cost of the candidate target wheel diameter distribution vector, selecting the candidate target wheel diameter distribution vector for which the switch benefit is larger than the switch cost to a greatest extent as the target wheel diameter distribution vector.

9. The apparatus according to claim 8, further comprising:

generation component, configured to generate the known wheel diameter distribution vector clusters from known wheel diameter distribution vectors in history records.

10. The apparatus according to claim 9, wherein the generation component comprises:

an acquiring component configured to acquire a plurality of known wheel diameter distribution vectors and their corresponding actual wear rates from the history records;

a clustering component configured to cluster the plurality of known wheel diameter distribution vectors and corresponding actual wear rates to generate the known wheel diameter distribution vector clusters; and a calculating component configured to calculate an average wear rate of each known wheel diameter distribution vector cluster.

11. The apparatus according to claim 8, wherein the first potential wear rate determining component comprises:

a weighted average calculation component configured to calculate a weighted-average wheel diameter distribution vector of each known wheel diameter distribution vector cluster;

a distance calculation component configured to calculate the distance between the current wheel diameter distribution vector and the average wheel diameter distribution vector and take the distance as the similarity score.

12. The apparatus according to claim 8, wherein the first potential wear rate determining component comprises:

a distance component configured to, for a certain known wheel diameter distribution vector cluster, calculate the distance between each known wheel diameter distribution vector included therein and the current wheel diameter distribution vector;

a similarity component configured to determine the similarity score between the known wheel diameter distribution vector cluster and the current wheel diameter distribution vector according to the number of known wheel diameter distribution vectors within the known wheel diameter distribution vector cluster, whose distance to the current wheel diameter distribution vector meets a distance condition.

13. The apparatus according to claim 8, wherein the second potential wear rate determining component comprises:

an enumeration component configured to enumerate all candidate target wheel diameter distribution vectors that can be obtained through adjusting axle sequence of the vehicle; and a similarity score component configured to, for each enumerated candidate target wheel diameter distribution vector, calculate the similarity score between it and the known wheel diameter distribution vector clusters.

14. The apparatus according to claim 8, wherein the acquisition component comprises:

an acquiring component configured to acquire a current wheel diameter distribution vector of left wheels and a current wheel diameter distribution vector of right wheels; and a combining component configured to combine the current wheel diameter distribution vector of the left wheels and the current wheel diameter distribution vector of the right wheels as the current wheel diameter distribution vector.

* * * * *